United States Patent
Tu et al.

(10) Patent No.: US 11,852,865 B2
(45) Date of Patent: Dec. 26, 2023

(54) OPTICAL SYSTEM WITH PHASE SHIFTING ELEMENTS

(71) Applicant: Apple Inc., Cupertino, CA (US)

(72) Inventors: Yongming Tu, Redwood City, CA (US); Alfredo Bismuto, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 17/386,362

(22) Filed: Jul. 27, 2021

(65) Prior Publication Data

US 2022/0091334 A1    Mar. 24, 2022

Related U.S. Application Data

(60) Provisional application No. 63/082,909, filed on Sep. 24, 2020.

(51) Int. Cl.
*G02B 6/12* (2006.01)

(52) U.S. Cl.
CPC ..... *G02B 6/12014* (2013.01); *G02B 6/12016* (2013.01)

(58) Field of Classification Search
None
See application file for complete search history.

(56) References Cited

U.S. PATENT DOCUMENTS

| | | |
|---|---|---|
| 5,287,376 A | 2/1994 | Paoli |
| 5,488,678 A | 1/1996 | Taneya |
| 5,546,483 A * | 8/1996 | Inoue ................. G02B 6/12014 398/20 |
| 5,644,667 A | 7/1997 | Tabuchi |
| 5,708,674 A | 1/1998 | Berrnink |
| 5,742,631 A | 4/1998 | Paoli |

(Continued)

FOREIGN PATENT DOCUMENTS

| | | |
|---|---|---|
| EP | 1403985 | 3/2004 |
| EP | 1432045 | 6/2004 |

(Continued)

OTHER PUBLICATIONS

International Search Report and Written Opinion dated Nov. 9, 2021, PCT/US2021/046367, 12 pages.

(Continued)

*Primary Examiner* — Jerry Rahll
(74) *Attorney, Agent, or Firm* — Brownstein Hyatt Farber Schreck, LLP

(57) ABSTRACT

Configurations for an optical system with phase shifting elements are disclosed. The optical system may include a first waveguide that provides light to a second waveguide, which may be a slab waveguide. A phase shifting element may be disposed on the slab waveguide and may be heated to induce a temperature change in the slab waveguide. By increasing the temperature of the propagation region of the slab waveguide, the index of refraction of the propagation region of the slab waveguide may shift, thus causing the index of refraction of light propagating through the propagation region to shift, thus shifting the phase of the light. This may result in an optical component capable of phase shifting light for reducing coherent noise while being energy efficient and maintaining a small form factor.

23 Claims, 8 Drawing Sheets

(56) References Cited

U.S. PATENT DOCUMENTS

| | | |
|---|---|---|
| 5,850,411 A | 12/1998 | Major, Jr. |
| 5,915,165 A | 6/1999 | Sun |
| 6,122,042 A | 9/2000 | Wunderman et al. |
| 6,330,378 B1 | 12/2001 | Forrest |
| 6,393,185 B1 | 5/2002 | Deacon |
| 6,594,409 B2 | 7/2003 | Dutt et al. |
| 6,628,686 B1 | 9/2003 | Sargent |
| 6,657,723 B2 | 12/2003 | Cohen |
| 6,795,622 B2 | 9/2004 | Forrest |
| 6,803,604 B2 | 10/2004 | Takahashi et al. |
| 6,892,449 B1 | 5/2005 | Brophy et al. |
| 6,940,182 B2 | 9/2005 | Hilton et al. |
| 6,947,639 B2 | 9/2005 | Singh |
| 6,952,504 B2 | 10/2005 | Bi |
| 6,987,906 B2 | 1/2006 | Nakama et al. |
| 7,054,517 B2 | 5/2006 | Mossberg |
| 7,058,245 B2 | 6/2006 | Farahi |
| 7,079,715 B2 | 7/2006 | Kish |
| 7,189,011 B2 | 3/2007 | Harker |
| 7,203,401 B2 | 4/2007 | Mossberg |
| 7,203,426 B2 | 4/2007 | Wu et al. |
| 7,209,611 B2 | 4/2007 | Joyner |
| 7,245,379 B2 | 7/2007 | Schwabe |
| 7,283,694 B2 | 10/2007 | Welch |
| 7,314,451 B2 | 1/2008 | Halperin et al. |
| 7,324,195 B2 | 1/2008 | Packirisamy et al. |
| 7,366,364 B2 | 4/2008 | Singh |
| 7,447,393 B2 | 11/2008 | Yan |
| 7,460,742 B2 | 12/2008 | Joyner |
| 7,477,384 B2 | 1/2009 | Schwabe |
| 7,483,599 B2 | 1/2009 | Dominic et al. |
| 7,526,007 B2 | 4/2009 | Chua et al. |
| 7,558,301 B2 | 7/2009 | Lin et al. |
| 7,680,364 B2 | 3/2010 | Nilsson |
| 7,720,328 B2 | 5/2010 | Yan |
| 7,885,302 B2 | 2/2011 | Eberhard |
| 7,885,492 B2 | 2/2011 | Welch |
| 7,974,504 B2 | 7/2011 | Nagarajan |
| 8,204,091 B2 | 6/2012 | Hu et al. |
| 8,300,994 B2 | 10/2012 | Welch et al. |
| 8,559,775 B2 | 10/2013 | Babie et al. |
| 8,564,784 B2 | 10/2013 | Wang et al. |
| 8,724,100 B1 | 5/2014 | Asghari et al. |
| 8,920,332 B2 | 12/2014 | Hong et al. |
| 8,983,250 B2 | 3/2015 | Black et al. |
| 9,020,004 B2 | 4/2015 | Jeong |
| 9,031,412 B2 | 5/2015 | Nagarajan |
| 9,110,259 B1 | 8/2015 | Black |
| 9,135,397 B2 | 9/2015 | Denyer et al. |
| 9,176,282 B2 | 11/2015 | Pottier |
| 9,217,669 B2 | 12/2015 | Wu et al. |
| 9,256,028 B2 | 2/2016 | Li |
| 9,348,154 B2 | 5/2016 | Hayakawa |
| 9,370,689 B2 | 6/2016 | Guillama et al. |
| 9,405,066 B2 | 8/2016 | Mahgerefteh |
| 9,543,736 B1 | 1/2017 | Barwicz et al. |
| 9,620,931 B2 | 4/2017 | Tanaka |
| 9,766,370 B2 | 9/2017 | Aloe et al. |
| 9,804,027 B2 | 10/2017 | Fish et al. |
| 9,829,631 B2 | 11/2017 | Lambert |
| 9,880,352 B2 | 1/2018 | Florjanczyk |
| 9,943,237 B2 | 4/2018 | Baker et al. |
| 9,948,063 B2 | 4/2018 | Caneau et al. |
| 10,009,668 B2 | 6/2018 | Liboiron-Ladouceur |
| 10,132,996 B2 | 11/2018 | Lambert |
| 10,238,351 B2 | 3/2019 | Halperin et al. |
| 10,285,898 B2 | 5/2019 | Douglas et al. |
| 10,310,196 B2 | 6/2019 | Hutchison |
| 10,429,597 B2 | 10/2019 | Ten Have et al. |
| 10,529,003 B2 | 1/2020 | Mazed |
| 10,663,662 B1 * | 5/2020 | Gehl ............... G02B 6/122 |
| 10,687,718 B2 | 6/2020 | Allec et al. |
| 10,852,492 B1 | 12/2020 | Vermeulen et al. |
| 11,064,592 B1 | 7/2021 | Bismuto et al. |
| 2004/0126117 A1 | 7/2004 | Lo et al. |
| 2005/0053112 A1 | 3/2005 | Shams-Zadeh-Amiri |
| 2005/0063431 A1 | 3/2005 | Gallup et al. |
| 2005/0063631 A1 * | 3/2005 | Junnarkar ........... G02B 6/12028 385/5 |
| 2006/0002443 A1 | 1/2006 | Farber et al. |
| 2007/0086703 A1 * | 4/2007 | Kirk ................... G02B 6/12007 385/24 |
| 2008/0044128 A1 | 2/2008 | Kish et al. |
| 2008/0310470 A1 | 12/2008 | Ooi et al. |
| 2011/0164879 A1 * | 7/2011 | Vasilyev ............ G02B 6/12014 398/81 |
| 2013/0294724 A1 * | 11/2013 | Li ....................... G02B 6/2817 385/24 |
| 2014/0029943 A1 | 1/2014 | Mathai et al. |
| 2015/0309258 A1 * | 10/2015 | Fincato ............... G02B 6/12014 398/87 |
| 2016/0224750 A1 | 8/2016 | Kethman et al. |
| 2017/0164878 A1 | 6/2017 | Connor |
| 2019/0339468 A1 | 11/2019 | Evans |
| 2019/0342009 A1 | 11/2019 | Evans |
| 2020/0152615 A1 | 5/2020 | Krasulick et al. |
| 2020/0244045 A1 | 7/2020 | Bismuto et al. |
| 2020/0253547 A1 | 8/2020 | Harris et al. |
| 2020/0309593 A1 | 10/2020 | Bismuto et al. |
| 2021/0033805 A1 | 2/2021 | Bishop et al. |
| 2021/0199576 A1 | 7/2021 | Arbore et al. |

FOREIGN PATENT DOCUMENTS

| | | |
|---|---|---|
| GB | 2359898 | 9/2001 |
| JP | H08122832 | 5/1996 |
| JP | 2006195036 | 7/2006 |
| JP | 2008262118 | 10/2008 |
| WO | WO 01/014929 | 3/2001 |
| WO | WO 04/031824 | 4/2004 |
| WO | WO 05/091036 | 9/2005 |
| WO | WO 11/090274 | 7/2011 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 20/106974 | 5/2020 |

OTHER PUBLICATIONS

He et al., "Integrated Polarization Compensator for WDM Waveguide Demultiplexers," *IEEE Photonics Technology Letters* vol. 11, No. 2, Feb. 1999, pp. 224-226.

Schiffer et al., "Smart Dynamic Wavelength Equalizer Based on an Integrated Planar Optical Circuit for Use in the 1550-nm Region," IEEE Photonics Technology Letters, vol. 11, No. 9, Sep. 1, 1999, pp. 1150-1152.

Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.

Kybartas et al., "Capacitive Sensor for Respiratory Monitoring," Conference "Biomedical Engineering," Nov. 2015, 6 pages.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Worhoff et al., "Flip-chip assembly for photonic circuits," MESA+ Research Institute, University of Twente, Integrated Optical MicroSystems Group, The Netherlands, 12 pages.

\* cited by examiner

OPTICAL SYSTEM WITH PHASE SHIFTING ELEMENTS

CROSS-REFERENCE TO RELATED APPLICATION

This application is a nonprovisional of, and claims the benefit under 35 U.S.C. § 119(e) of, U.S. Provisional Patent Application No. 63/082,909, filed Sep. 24, 2020, the contents of which are incorporated herein by reference as if fully disclosed herein.

FIELD

This disclosure relates generally to an optical system with emitting and receiving light sources, waveguides, and a diffuser. More particularly, embodiments herein relate to an optical system for varying the phases of a wavefront of light using multiple individually controlled phase shifting elements.

BACKGROUND

Generally, optical systems may employ multiple light sources for measuring various types of information or for use in everyday devices such as global positioning system watches, scanners, depth sensing systems, projection systems, and so forth. In some examples, the optical system may employ a free space diffuser that light may pass through in order to reduce coherent noise interference. For example, laser projectors for use in projection systems may employ a diffuser to reduce light that has a spatial interference pattern that produces noise. This spatial interference pattern may produce graininess in an image and/or interference in an optical signal, thus obscuring the image and/or the optical signal.

SUMMARY

Embodiments of the systems, devices, methods, and apparatuses described in the present disclosure are directed to an optical system for phase shifting light to reduce coherent noise. Also described are systems, devices, methods, and apparatuses directed to mitigating coherent noise using on-chip diffuser and de-cohered light together. An optical system may include a first waveguide such as a strip waveguide, a second waveguide, such as a slab waveguide that is optically coupled to the strip waveguide, a reflective element, and phase shifting elements. In some examples, the reflective element may be parabolic-shaped and provide collimated light. In some examples, the phase shifting elements may be a metal pad, which may be heated by applying a current to the metal pad. The phase shifting elements may be disposed on the slab waveguide through which the light may propagate. As the phase shifting elements increase in heat, a local portion of the slab waveguide may also increase in temperature and the index of refraction may shift. The shift in the index of refraction of the propagation region of the slab waveguide may cause the phase of the light to shift.

In some examples, the present disclosure describes an optical system. The optical system may include a first waveguide configured to provide light, a second waveguide optically coupled to the first waveguide and configured to receive the light from the first waveguide, a reflective element configured to reflect the light, and multiple phase shifting elements configured to phase shift a first portion of the light by a first phase and phase shift a second portion of the light by a second phase that is different than the first phase. In some examples, the reflective element has a parabolic shape to collimate the reflected light, the multiple phase shifting elements phase shift the first portion of the light and the second portion of the light locally changing an index of refraction of the second waveguide, the multiple phase shifting elements provide randomized phase shifts of the first and second portions of light, and the first and the second phase shifts are associated with different coherent noise views.

In some examples, the reflective element may be a metal-coated surface. In some examples, the multiple phase shifting elements are metal pads. In some examples, the multiple phase shifting elements are offset from a nearest neighbor along both axes of a plane in which all of the multiple phase shifting elements lie. In some examples, the first portion of light is phase shifted by a first phase shifting element of the multiple phase shifting elements and the second portion of light is phase shifted by the first phase shifting element and a second phase shifting element of the multiple phase shifting elements. In some examples, the first portion of light is phase shifted by changing a temperature of a corresponding phase shifting element of the multiple phase shifting elements. In some examples, the change in the temperature of the corresponding phase shifting element locally changes an index of refraction of a portion of a slab waveguide.

In some examples, the present disclosure describes an optical system that provides randomly phase shifted light. The optical system may include a strip waveguide configured to emit light, a slab waveguide optically coupled to the strip waveguide and positioned to receive the light from the strip waveguide, a reflective element optically coupled to and positioned on an edge of the slab waveguide and configured to receive the light from the slab waveguide and reflect the light, and may include multiple phase shifting elements disposed on the slab waveguide and may be configured to phase shift a first portion of the light by a first phase and phase shift a second portion of the light by a second phase. In some examples, the slab waveguide may include a first cladding layer, a propagation region, and a second cladding layer, where the multiple phase shifting elements are disposed on the first cladding layer to phase shift light propagating through the slab waveguide. In some examples, the first portion of light propagates proximate to a first phase shifting element and the second portion of light propagates proximate to a second phase shifting element different than the first phase shifting element.

In some examples, each of the multiple phase shifting elements may be a metal pad. In some examples, a first phase shifting element of the multiple phase shifting elements and a second phase shifting element of the multiple phase shifting elements, where the first and second phase shifting elements are nearest neighbors, the first and second phase shifting elements both lie in a plane, and the first phase shifting element partially overlaps the second phase shifting element in one dimension of the plane in which the first and second phase shifting elements lie. In some examples, a current source is configured to apply random currents to the multiple phase shifting elements, thereby changing temperatures of the multiples phase shifting elements. In some examples, the reflective element is parabolic and configured to reflect light such that a wavefront of the light is a plane wave.

In some examples, the present disclosure describes a method for providing a wavefront with randomized phase shifts of light. The method may include emitting light from a first waveguide into a second waveguide, reflecting the light from a reflective element that collimates the light and is positioned at an edge of the second waveguide, shifting a phase, using a first phase shifting element, of a first portion of light by a first phase, and shifting a phase, using a second phase shifting element, of a second portion of light by a second phase that is different than the first phase. In some examples, shifting the phase of the first portion of light and the second portion of light may include heating the first phase shifting element to a first temperature and heating the second phase shifting element to a second temperature that is different than the first temperature. In some examples, heating the first phase shifting element to the first temperature may include applying a first current to the first phase shifting element and heating the second phase shifting element to the second temperature may include applying a second current to the second phase shifting element, where the second current is different from the first current. In some examples, heating the first phase shifting element changes an index of refraction of the second waveguide and heating the second phase shifting element changes an index of refraction of the second waveguide. In some example, the first phase is based, at least in part, on an index of refraction shift to the second waveguide, when the first portion of light propagates proximate to multiple phase shifting elements. In some examples, applying a unique current to the first phase shifting element and the second phase shift element, may heat the first and second phase shifting elements. In some examples, the method may include applying a first current to the first phase shifting element and applying a second current to the second phase shifting element, where the first and second currents are different and the first and second phase shifting elements are individually controllable. In some examples, the method may include applying a first time-randomized current to the first phase shifting element and applying a second time-randomized current to the second phase shifting element.

In addition to the example aspects and embodiments described above, further aspects and embodiments will become apparent by reference to the drawings and by study of the following description.

Figure 1:
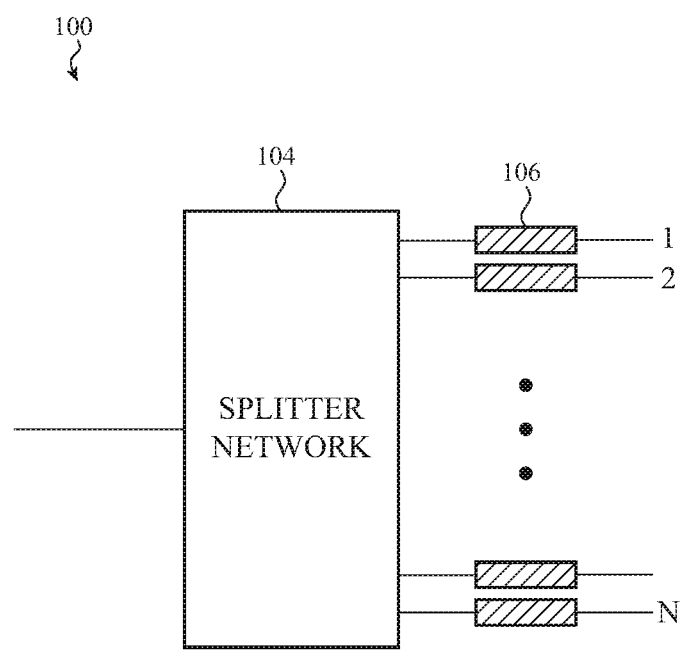
FIG. 1 illustrates an example of a light splitting system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Directional terminology, such as "top", "bottom", "upper", "lower", "above", "below", "beneath", "front", "back", "over", "under", "left", "right", and so forth, is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways.

As used herein, the term "abutting" means that two elements share a common boundary or otherwise contact one another, while the term "adjacent" means that two elements are near one another and may (or may not) contact one another. Thus, elements that are abutting are also adjacent, although the reverse is not necessarily true. Two elements that are "coupled to" one another may be permanently or removably physically coupled to one another and/or operationally or functionally coupled to one another. Additionally, two elements that are "optically coupled" to one another may allow light to pass from one element to the other element.

In the following description of examples, reference is made to the accompanying drawings in which it is shown by way of illustration specific examples that can be practiced. It is to be understood that other examples can be used, and structural changes can be made without departing from the scope of the various examples.

Generally, noise, such as random or semi-random noise, may be present in various types of imaging systems and may cause unwanted modifications of a signal. In some cases, the noise in the imaging systems may be coherent noise. Noise may degrade images in systems such as medical ultrasound systems, radar systems, projection systems, or any other coherent imaging system by causing graininess, granular patterns, or intensity patterns in the image. Some systems may produce signals with so much noise that it may be difficult to separate the measured signal. In some examples, coherent multipath-interference may be a noise source, one example of which may be speckle noise.

In some cases, coherent noise may significantly interfere with the detection of an optical signal. Thus, illumination conditions may be designed to mitigate coherent noise while maintaining other specifications of the optical system such as operating speed and size. Different factors may be considered when mitigating or reducing coherent noise including, but not limited to, illumination conditions within the geometrical specification of the system (such as intensity profile of the light), the angle distribution or beam spread angles of the light, and the number of moving parts of the optical system.

In mitigating noise in optical systems, coherent noise may be reduced without exacerbating other noise sources in the optical system such as detector noise and laser noise. In some examples, coherent noise may be reduced by combining the functionality of multiple elements in the optical system, such as a moving free space diffuser and a phase shifter in the integrated optics. Another way coherent noise may be mitigated is by each output providing a slightly different wavelength. Additionally, coherent noise may be mitigated by de-cohering multiple light outputs from each other via temporally varying phase relationships. These phase relationships may be generated by phase shifters, frequency modulators, and/or from chirping and group delay, any combination thereof, and so forth. Further, a first light output may have a first phase at a first time and a second light output may have a second phase at a second time, thus the first and second light outputs may have a first phase relationship at a first time. Either one or both of the first and second phases of the first and second light outputs may shift at a second time, and the phase relationship may change. By using these elements in conjunction with observing other specifications of the optical system, coherent noise may be mitigated or reduced so that optical signals may be measured more effectively by the optical system. In some instances, a free space diffuser may be too large to reasonably incorporate into a photonics device. A "photonics device" is a device with photonics and/or optical functionality and components, and generally is a device or structure that includes the optical system described herein with respect to at least FIGS. 3-5, as well as surrounding photonics elements and optical structures.

Disclosed herein are optical systems, devices, and methods for mitigating coherent noise using on-chip diffuser and de-cohered light together. The term "on-chip" is used to describe photonics and/or optical elements that are not free space components, but instead are part of the chip. Although additional elements may be soldered or adhered to the chip, while these elements may be part of the photonics device, they are not part of the chip. Further, materials such as metals, dielectrics, and so forth that are deposited, evaporated, and so forth may be part of both the chip and the photonics device. An optical system described herein may include a first waveguide such as a strip waveguide, a second waveguide such as a slab waveguide that is optically coupled to the strip waveguide, a reflective element, and phase shifting elements. In some examples, the reflective element may be parabolic-shaped, receive light from the slab waveguide, and provide collimated light.

In some examples, the phase shifting elements may be a set of metal pads, each of which may be heated by applying a current to a respective metal pad. In other examples, there may be a single metal pad that may be used to phase shift the light. The phase shifting elements may be disposed on the slab waveguide through which the light may propagate. As the phase shifting elements heat up, a local portion of the slab waveguide may also increase in temperature and the index of refraction may shift. The shift in the index of refraction of the propagation region of the slab waveguide may cause the phase of the light to shift. A locally heated portion of the slab waveguide may be a portion of the propagation region of the slab waveguide that is thermally affected by the temperature change of the metal. The locally heated portion may be no larger than the metal pad by which it was affected, and the locally heated region may be confined and/or small enough to not affect adjacent regions of slab waveguide. Further, adjacent phase shifting elements may not materially affect the temperature of one another.

In some instances, the phase shifting elements may adjust the temperature of the slab waveguide by increasing its temperature. The slab waveguide may include a propagation region with cladding layers on both sides of the propagation region. Generally, adjusting a temperature of the propagation region of the slab waveguide results in a shift in the index of refraction of the propagation region, thus shifting the phase of light passing through the propagation region, thereby reducing coherent noise.

These and other embodiments are discussed below with reference to FIGS. 1-5. However, those skilled in the art will readily appreciate that the detailed description given herein with respect to these Figures is for explanatory purposes only and should not be construed as limiting.

FIG. 1 illustrates an example of a light splitting system. The light splitting system 100 may be used to split light and phase shift the light outputs in order to reduce coherent noise. The light splitting system 100 may include a splitter network 104 of light splitting components such as cascading sets of splitters, interferometers, de-multiplexers, and so forth. The splitter network 104 may receive a light input and may split the received light into multiple outputs as depicted in FIG. 1. These multiple outputs may be received by phase shifters 106 that may provide light outputs 1-n, as any number of light outputs may be used.

In FIG. 1, the phase shifters 106 may phase shift each of the light outputs of the splitter network 104 to a different phase than each other output. That is, light output one may have a different phase than light output two, and so forth through light output n, such that each light output may have a different phase than every other light output. By providing light with different phase shifts, coherent noise may be reduced in an optical signal. In the example of the light splitting system 100, the size of the splitter network 104 may scale with the number of desired light outputs. Similarly, the number of phase shifters scales with the number of desired phase shifts of light. This may cause the light splitting system to become too large to reasonably incorporate into an optical system. Additionally, the phase shifted light is limited by the number of phase shifters, so the light may not become de-correlated as desired.

Figure 2:
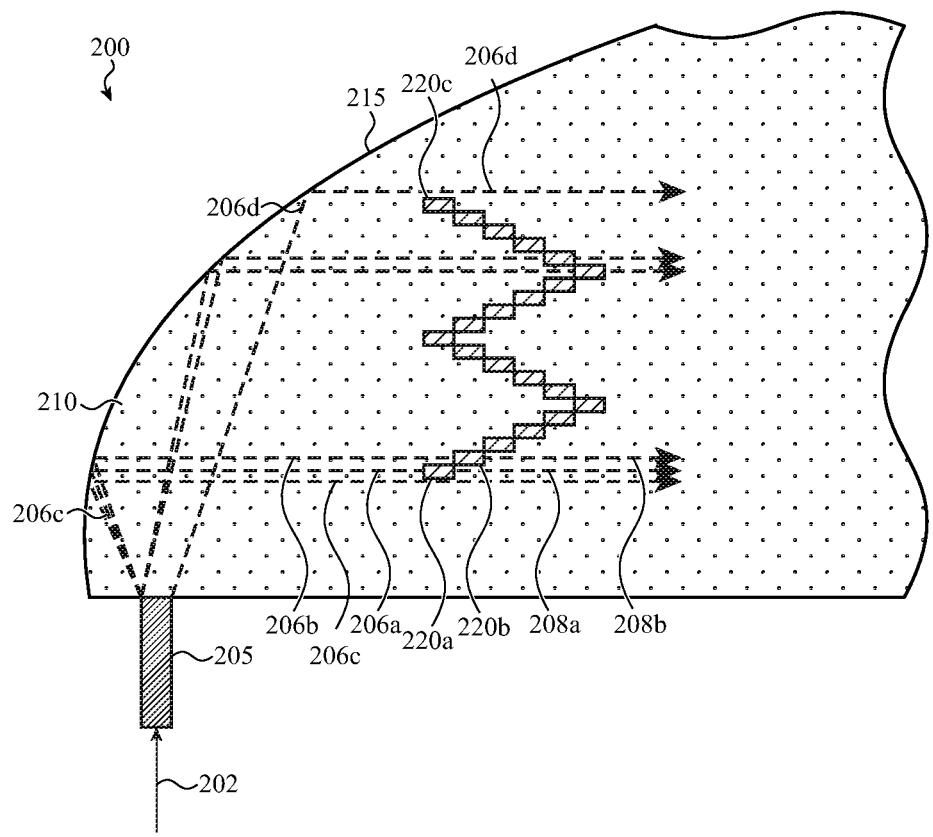
FIG. 2 illustrates an optical system with active diffusing elements.

FIG. 2 illustrates an optical system with active diffusing elements. The optical system 200 includes a first waveguide 205, a second waveguide 210, a reflective element 215, and phase shifting elements 220a and 220b. The optical system 200 may provide light 202 which may or may not have a different phase. The light may propagate on light paths, and one or more portions of light may be affected by one or more of the phase shifting elements 220a, 220b and as a result may have different phase shifts. The phase shifted light may reduce coherent noise in the optical system as will be described herein with reference to FIGS. 2 and 4A-5.

In FIG. 2, the first waveguide 205 may receive light 202 from light sources (not illustrated in FIG. 2) and provide the light to a second waveguide 210. In some examples, the first waveguide 205 provides light 202 with one wavelength. Although light 202 may be described as having the same wavelength, in some examples, light 202 may include multiple wavelengths in a wavelength range. The optical system 200 in FIG. 2 is a top down view, thus only the top surface of the second waveguide 210 is illustrated, where second waveguide 210 may be a slab waveguide. As illustrated, the area of the second waveguide 210 may extend at least along the curvature of the reflective element 215 to the ends of the illustrated portions of light. The perimeter of the first waveguide 205 and the second waveguide 210 may be surrounded by a cladding material to confine light to the first waveguide 205 and the second waveguide 210.

In some examples, the first waveguide 205 may be a strip waveguide in a photonics device. Although one strip waveguide is depicted in FIG. 2, multiple strip waveguides may be used to provide light to the second waveguide 210. The waveguides may provide light insofar as the light may pass through the waveguide and/or into and out of the waveguides.

In some examples, the optical system 200 may receive light generated from the light sources that provide light to the first waveguide 205. In some examples, the light sources as well as the optical system 200 may be connected to or otherwise integrated into a photonics device. The light sources may be one or more of a laser, diode, coherent light source, or semi-coherent light source, any combination thereof, and so forth. Although the light provided by the first waveguide 205 is depicted by six portions of light, it may be understood that the portions of light 206c and 206d may represent the approximate outer bounds of light provided to the second waveguide 210 and that multiple portions of light not illustrated in FIG. 2 also may be provided from the first waveguide 205 to the second waveguide 210.

The light 202 received by the first waveguide 205 may be transmitted and received by the second waveguide 210 and may propagate along respective light paths in the second waveguide 210. The first waveguide 205 may be optically coupled to the second waveguide 210 and may be adjacent to or abutted against the second waveguide 210. In some examples, the second waveguide 210 may be a slab waveguide. The second waveguide 210 may include a first cladding layer, a propagation region, and a second cladding region. In some examples, the first and second cladding layers (not specifically illustrated in FIG. 2) of the second waveguide 210 may be an oxide or other dielectric material that may serve as a cladding and the propagation region may be silicon. Further, the phase shifting elements 220 may be disposed on the first cladding layer of the second waveguide 210. In some examples, the portions of light propagating in the second waveguide 210 may define the light paths in the second waveguide 210 and may travel in the propagation region of the second waveguide 210. Depending on the light path or the propagation direction of the portion of light, each portion of light may be affected differently by the temperature change of the phase shifting elements 220. Light 206c and 206d transmitted by the first waveguide 205 illustrate possible boundaries of the light provided by the first waveguide 205. Although only six portions of light are depicted as propagating from the first waveguide 205 to the reflective element 215 through the second waveguide 210, it may be understood that any number of portions of light may propagate through the second waveguide 210 from the first waveguide 205.

The light may propagate along light paths and the reflective element 215 may receive the light. The light may be reflected by the reflective element 215 with multiple portions of light 206a and 206b. The portion of light 206a may propagate on a first light path and the portion of light 206b may propagate on a second light path. Similar to the light provided to the reflective element 215, portions of light 206a and 206b may travel in the propagation region of the second waveguide 210.

In some examples, the reflective element 215 may incorporate reflective facets that may enlarge mode sizes of the light and may also collimate the light. In some examples, the reflective element 215 may be formed in a multi-step operation, starting with etching the cladding and propagation region of the second waveguide 210. The reflective facets formed by etching may then be coated with a reflective material such as metal, and, in some examples, aluminum. The reflective element 215 is typically an "on-chip" mirror.

In some examples, the reflective element 215 may be parabolic, such that the wavefront of light reflected from the reflective element 215 may be a planar with parallel or approximately parallel beams that are collimated, as shown by portions of light 206a and 206b. By contrast, a circular reflective element generally produces a curved wavefront. In some examples, the light 206a, 206b may be semi-collimated. The wavefront is an optical wave that has a constant phase for the light waves at a given time and may propagate with a phase velocity. The wavefront may vary with time.

In some examples, the phase shifting elements 220a and 220b may be disposed on the second waveguide 210. The multiple phase shifting elements 220a, 220b may be configured to or otherwise positioned to phase shift the first portion of light 206a by a first phase to produce portion of light 208a and to phase shift the second portion of light 206b by a second phase to produce portion of light 208b. The first and second portions of light 206a and 206b may be passing through the propagation region of the second waveguide 210 before the phases are changed.

In some examples, the phase shifting elements 220a and 220b may be metal pads such as gold, platinum, or other suitable metals. As shown in FIG. 2, the phase shifting elements 220a and 220b may be offset in two dimensions from one another. The phase shifting elements 220a and 220b may be axially offset along two axes that define a plane in which all of the phase shifting element 220 lie. Although the phase shifting elements 220a and 220b are depicted as non-overlapping in two dimensions, other configurations are possible as will be described with reference to FIGS. 4A-5.

The configuration and/or relative positioning of the phase shifting elements may be based at least in part on how many randomized phase shifts the system may employ for reducing coherent noise. The phase shifts of light may depend on at least the applied current to the phase shifting elements 220 (which heats the phase shifting elements 220 and changes the index of refraction of the slab waveguide), and also a path length differential where the light is affected by the phase shifting elements 220. For example, for a given planar wavefront, a portion of light 206a may be affected by phase shifting element 220a first (e.g., before portion of light 206b) as the phase shifting element 220a may have the shortest total path length between the first waveguide 205 and the phase shifting elements 220. The portion of light 206b may be affected by the phase shifting element 220b after the portion of light 206a as it may be farther away than the phase shifting element 220a. That is, the total path length for phase shifting element 220b may be longer due to the location of the phase shifting element 220b relative to the phase shifting element 220a. Because the phase shifting elements 220b affect the portions of light at different points along the light paths, the phase front may be varied.

The phase shifting elements 220a and 220b may be positioned on the second waveguide 210 so that the portions of light 206a, 206b reflecting off of the reflective element 215 may be proximate to the phase shifting elements 220a and 220b. Although the portion of light 208a may be proximate to and be affected by a single phase shifting element 220a and the portion of light 208b may be proximate to and be affected by a single phase shifting element

220b, portions of light may pass under more than one phase shifting element as will be described in further detail with reference to FIGS. 4A-5. It may be understood that a portion of light may be "proximate to" the phase shifting elements when the portion of light is affected by the phase shifting element and experience a phase shift. Additionally, a portion of light that is proximate one or more phase shifting elements may pass under, over, beside, and so on to the phase shifting element.

The phase shifting elements 220a and 220b may serve the functionality of an on-chip diffuser insofar as the phase shifting elements may alter the phase of the light passing under the pads. By using the phase shifting elements as an on-chip diffuser, a free space diffuser may not be necessary, thus saving space and reducing the form factor of the photonics device. Although two phase shifting elements 220a and 220b are identified in FIG. 2, each of the pads depicted in FIG. 2 are phase shifting elements.

The phase shifting elements 220a and 220b may locally phase shift the light by locally heating the second waveguide 210 to provide portions of light 208a and 208b. In some examples, a current may be applied to the phase shifting elements 220a and 220b, which may cause the phase shifting elements 220a and 220b to increase in temperature. The temperature increase of the phase shifting elements 220a and 220b may propagate into the second waveguide 210 in a propagation region and may locally increase the temperature of the corresponding locally affected propagation region. It may be understood that the locally affected propagation regions are part of the larger propagation region of the slab waveguide that may be approximately planar, whereas the locally affected propagation region is only the portion near the phase shifting element.

For example, phase shifting element 220a may have a current applied to it and may heat up. The heat from the phase shifting element 220a may locally heat a portion of the propagation region, thus locally shifting the index of refraction. The portion of light 206a may propagate through the local affected part of the propagation region with the shift in the index of refraction and the light may be phase shifted.

In some examples, the phase shifting element 220a may be heated to a different temperature than the phase shifting element 220b and the respective propagation regions of the second waveguide 210 under the phase shifting elements 220a and 220b thus may be two different temperatures during operation of the photonics device. The temperature shift of the local propagation region may cause the index of refraction of the local propagation region to shift, thus shifting the phase of the light propagating through the temperature shifted propagation region and proximate to the phase shifting elements 220a and 220b. Additionally, the phase shift of the first and second portions of light 208a and 208b may be shifted by different amounts by locally changing the index of refraction of the second waveguide 210. When the two portions of light 208a and 208b have a first and second phase shift that are different from one another, the first and second phase shift may be configured to provide different coherent noise views.

In some instances, the same current may be applied at the same time to more than one phase shifting element, such as phase shifting elements 220a and 220c. Light affected by phase shifting elements 220a and 220c may be phase shifted at approximately the same time and point along the light paths, thus the light may have the same phase shift. Even though some of the light may have the same phase shift, the combined contribution to the system may not be material enough to negatively affect the coherent noise.

In some examples, the phase shifting elements 220a and 220b randomly phase shift each portion of light reflected by the reflective element 215. Different currents may be applied to each of the phase shifting elements 220a and 220b, which may cause two different temperature increases of the phase shifting elements 220a and 220b. The temperature increase of the corresponding regions of the second waveguide 210 may be localized even when phase shifting elements are adjacent to one another such as phase shifting elements 220a and 220b. Phase shifting element 220a may increase to a first temperature that causes a first region of the second waveguide 210 to also increase to the first temperature and the phase shifting element 220b may increase to a second temperature that causes a second region of the second waveguide 210 to increase to the second temperature. Each of the phase shifting elements of FIG. 2 may have different applied currents that may be applied either simultaneously, individually, or may be applied to two or more elements at the same time. The random applied currents to the phase shifting elements will be described in further detail herein with reference to FIGS. 4A-5.

Figure 3:
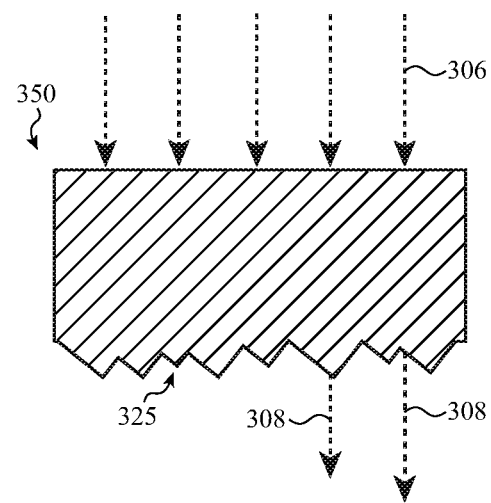
FIG. 3 illustrates light encountering a free space diffuser.

FIG. 3 illustrates light encountering a free space diffuser. As previously discussed with reference to FIG. 2, the phase shifting elements may function as an on-chip diffuser insofar as the phase shifting elements may mimic the functionality of a free space diffuser. Each of the portions of light may have a different phase caused by the phase shifting elements, thus mimicking the free space diffuser. The free space diffuser illustrated in FIG. 3, includes light 306 passing through the free space diffuser 350 and exiting as light 308, which may be randomly phase shifted by the rough surface of the free space diffuser 350.

The free space diffuser 350 may spread out and/or evenly distribute incoming light 306. In some examples, the free space diffuser 350 may include mini-structures on its surface. When light passes through these mini-structures, it may experience different phase shifts and exit the free space diffuser with a random phase. These random phases of light may disrupt spatial interference patterns that may otherwise produce coherent noise in an optical signal. Although the free space diffuser 350 may mitigate coherent noise in an optical signal by producing light 308 with random phase shifts from light having a common phase, the free space diffuser 350 may be difficult to use due to form factor and size constraints. Thus, an "on-chip" diffuser may still reduce coherent noise but may be more easily incorporated into a photonics device due to a smaller form factor.

In FIG. 3, light incident on the free space diffuser 350 is indicated by the downward arrows. When this light passes through the free space diffuser 350 at a first location, it may be phase shifted by a first amount. In order to phase shift light by a second amount or to obtain a new phase of light, light may pass through a different location than the first location on the free space diffuser 350. By passing through different locations on the free space diffuser 350, light may encounter different surface elements 325. These surface elements 325 may change the path length of light through the material, in addition to affecting the angle at which the light may exit the free space diffuser 350. Because of the way the free space diffuser provides multiple phase shifts, this type of system may be too large to integrate into a small form factor device such as a mobile device. By using the phase shifting elements as described with reference to FIGS. 3, 4A-5, randomly applied currents to the phase shifting elements may change the phase in an energy efficient manner in a small form factor photonics device.

Figure 4A:
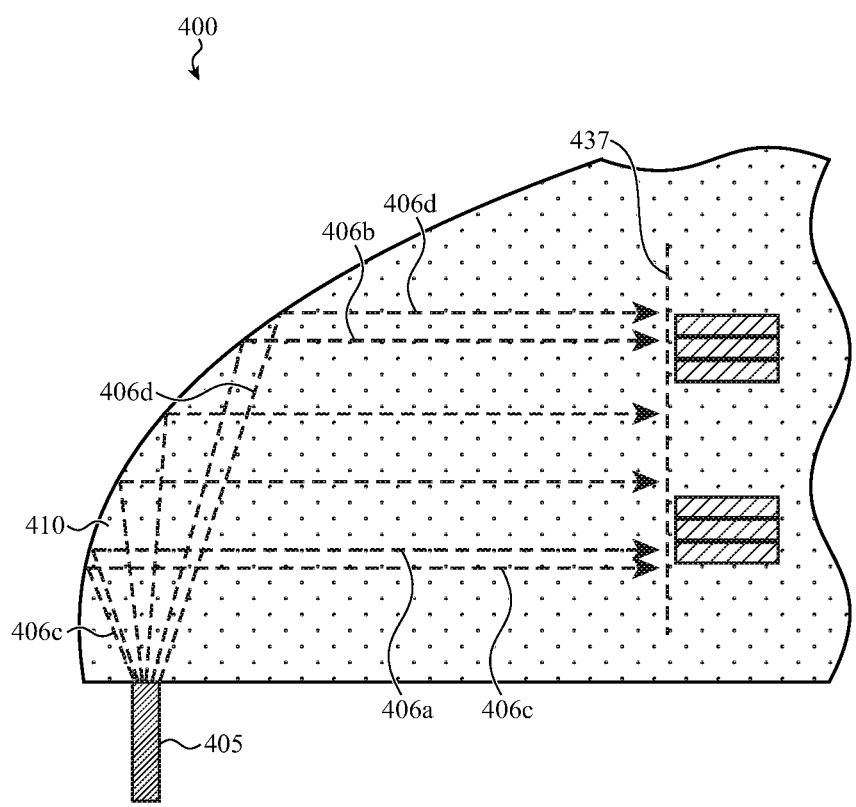
FIGS. 4A-4E illustrate multiple configurations of an optical system for phase shifting light.

FIGS. 4A-4E illustrate multiple configurations of an optical system for phase shifting light. In FIG. 4A, the optical system 400 may include a first waveguide 405, a second waveguide 410, a reflective element 415 and phase shifting elements 420a and 420b. The portions of light 406c and 406d may illustrate approximate outer bounds of light transmitted from the first waveguide 405 toward the reflective element 415 and through the second waveguide 410. FIGS. 4A-4E are similar to that of FIG. 3 and certain structures and operations are the same between the embodiments. Accordingly, differences between the embodiments will be discussed in detail. Other than as set out in the differences discussed herein, the description of the embodiment 300 shown in FIG. 3 and its operation, is the same as the embodiment 400 shown in FIGS. 4A-4E.

In FIG. 4A, the portions of light 406a, 406b, 406c, and 406d may reflect off of the reflective element 415, which may be a cylindrical reflective element. After the portions of light 406a, 406b, 406c, and 406d are reflected, the light in its entirety has a wavefront 437, which as illustrated in FIG. 4A may be a planar wavefront.

In the optical system 400, all of the phase shifting elements 420, including the phase shifting elements 420a and 420b may be arranged adjacent to one another and in a line. The first portion of light 406a propagating through the second waveguide 410 may be proximate to the phase shifting element 420a, which may be disposed on the second waveguide 410. Similarly, and second portion of light 406b propagating through the second waveguide 410 may be proximate to the phase shifting element 420b, which may be disposed on the second waveguide 410.

As the phase shifting elements increase in heat, localized portions of the slab waveguide may also increase in temperature and the index of refraction of the slab waveguide may shift. The shift in the index of refraction of the propagation region of the slab waveguide may cause a peak wavelength to also shift, thus shifting the phase of the corresponding portions of light. By applying a current to the phase shifting elements 420, the metal may increase in temperature and locally heat the portion of the slab waveguide near the phase shifting elements 420. When the slab waveguide increases in temperature, the index of refraction of the slab waveguide may change, thus shifting the phase of the corresponding light passing beneath the phase shifting elements 420.

In the example of FIG. 4A, the first portion of light 406a may be phase shifted by the first phase shifting element 420a and the second portion of light 406b may be phase shifted by the second phase shifting element 420b. The phase shift of the first and second portions of light may be induced by applying a current to the phase shifting elements 420a and 420b.

In FIG. 4A, the phase shifting elements 420 may lie in a plane and be aligned in one dimension and may be adjacent to one another. The configuration of the phase shifting elements may generally be based on the amount of randomized light to be produced by the optical system 400 to reduce coherent noise. In some examples, the configuration of the phase shifting elements may be based on the localized heating of the propagation region of the second waveguide 410 and temperature gradients that may exist. Another consideration in arranging the phase shifting element may be based on the power conservation or the energy efficiency of the optical system 400. In some other examples, the configuration of the phase shifting elements may be based on the form factor of the photonics device into which the optical system 400 may be incorporated.

Figure 4B:
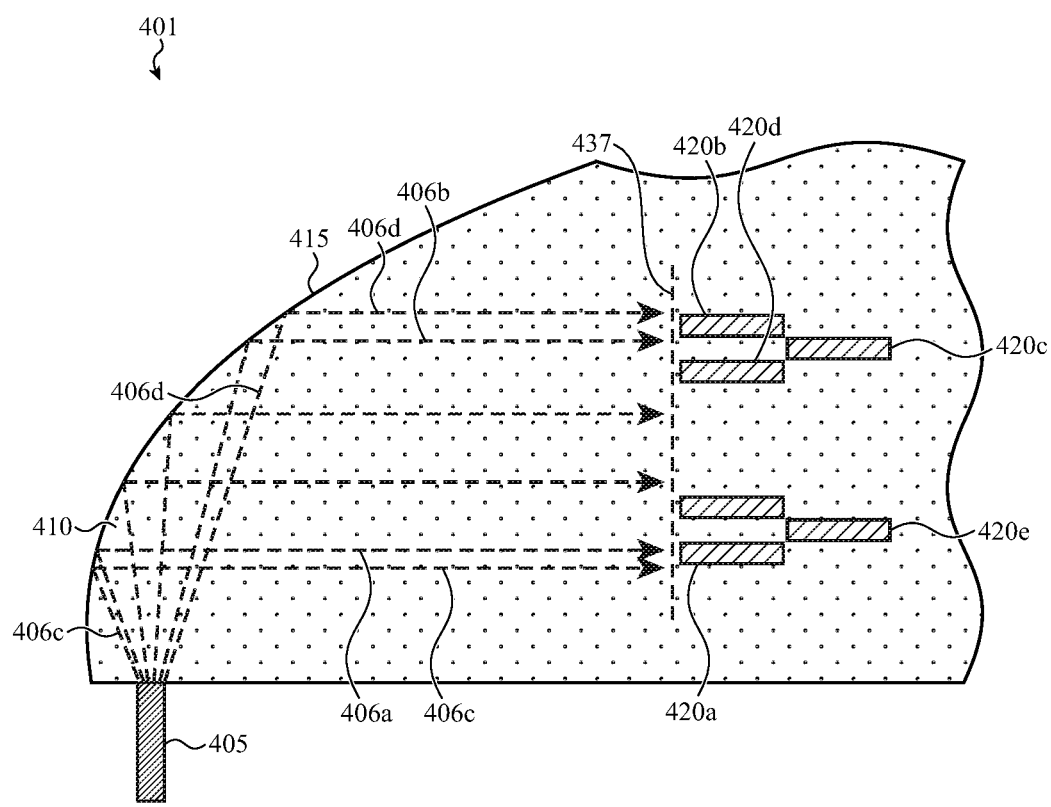

FIG. 4B is another configuration of an optical system for phase shifting light. The optical system 401 is a variation of the optical system 400 of FIG. 4A. The optical system 401 may include the same components of the optical system 400, with the phase shifting elements 420 in a different configuration. For the purposes of discussion, similarly numbered elements may have similar characteristics and functionality. As shown in FIG. 4B, the phase shifting elements 420 may be offset from one another in two dimensions.

All of the phase shifting elements 420 may generally lie in a plane, and phase shifting elements 420b and 420c are nearest neighbors and that do not overlap with one another in a first and second dimension of the plane. That is, the phase shifting elements are offset in a first and a second direction within a single plane. As such, the phase shifting elements are offset from their nearest neighbor along both axes of a plane in which all of the phase shifting elements lie.

In FIG. 4B, the portion of light 406b may not be affected by the phase shifting element 420d but may be proximate to the phase shifting element 420c, and thus may be affected by the temperature increase of this element. It may be understood that when a portion of light is affected by a phase shifting element, the portion of light may be phase shifted due to the index of refraction change caused by the temperature change of the corresponding phase shifting element. Additionally, the portion of light 406a may experience a phase shift induced by the temperature shift of phase shifting element 420a, but the portion of light 406a may not be phase shifted by the phase shifting element 420e.

Figure 4C:
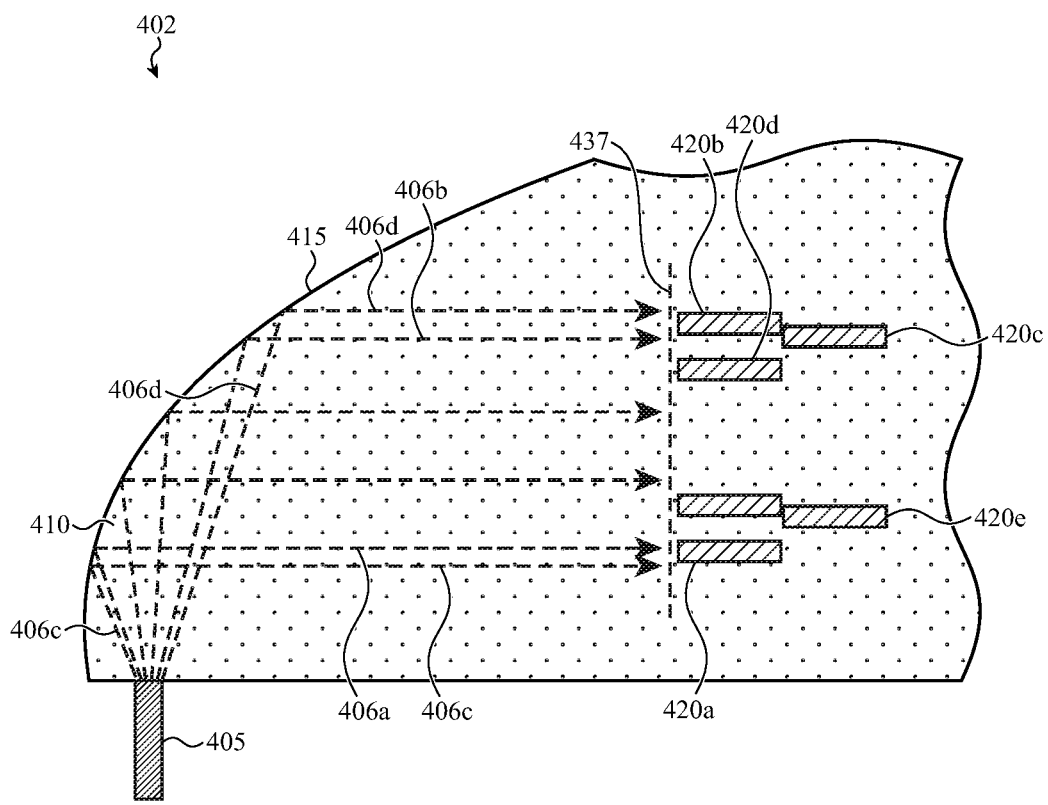

FIG. 4C is another configuration of an optical system for phase shifting light. The optical system 402 is a variation of the optical system 400 of FIG. 4A. The optical system 402 may include the same components of the optical system 400, with the phase shifting elements 420 in a different configuration. For the purposes of discussion, similarly numbered elements may have similar characteristics and functionality. The configuration of the phase shifting elements 420 of FIG. 4C may split the wavefront into finer pitches, where each wavefront may experience different phase tuning.

In some examples, the first phase shifting element 420b and the second phase shifting elements may be nearest neighbors and may both lie in a plane. In some examples, the first phase shifting element 420b may partially overlap the second phase shifting element 420c in one dimension of the plane in which the first and second phase shifting elements lie.

Additionally, in some examples, the first phase shifting element 420b may be a nearest neighbor to the phase shifting element 420c and both phase shifting elements 420b and 420c may lie in a plane. The phase shifting elements 420b and 420c may not overlap with one another in a first dimension of the plane but may overlap one another in a second dimension of the plane. As such, the phase shifting elements may be offset from their nearest neighbor along both axes of a plane in which both of the phase shifting elements 420b and 420c lie.

As illustrated, the phase shifting elements 420b and 420c may be spaced apart from one another in a first dimension of the plane, but phase shifting element 420b and 420c may be partially adjacent to or abutted up against one another in a second dimension of the plane. In FIG. 4C, the portion of light 406b may experience a phase shift caused by both of the phase shifting elements 420b and 420c. Additionally, the portion of light 406a may experience a phase shift induced by the temperature shift of phase shifting element 420a, but may not be affected by the phase shifting element 420e. It may be understood that when a portion of light is affected by a phase shifting element, the portion of light may be phase shifted due to the index of refraction change caused by the temperature change of the corresponding phase shifting element.

Figure 4D:
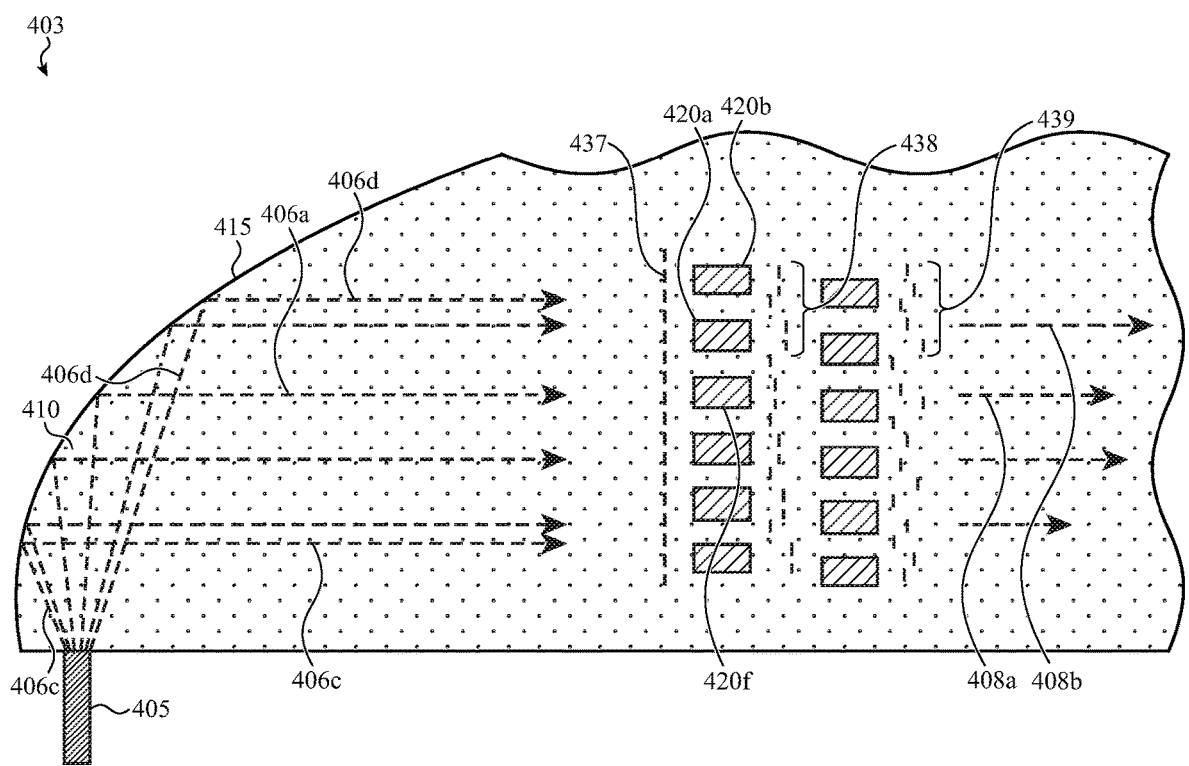

FIG. 4D is another configuration of an optical system for phase shifting light. The optical system 403 is a variation of the optical system 400 of FIG. 4A. The optical system 403 may include the same components of the optical system 400, with the phase shifting elements 420 in a different configuration. For the purposes of discussion, similarly numbered elements may have similar characteristics and functionality. By independently tuning the phase shifting elements 420 of FIGS. 4A-4E, more different interference patterns of light may be produced. As shown in both FIGS. 4D and 4E, the multiple stages of offset phase shifting elements 420 may serve to break down the wavefront to more small pitches.

The neighboring phase shifting elements 420b and 420c may lie in a plane and may not overlap with one another in a first dimension of the plane but may overlap one another in a second dimension of the plane. As such, the phase shifting elements may be offset from on another along both axes of a plane in which both of the phase shifting elements 420b and 420c lie. Further, neighboring phase shifting elements 420b, 420a, and 420f may be aligned in a first dimension of the plane, but not the second dimension of the plane. Although specific configurations of the phase shifting elements are described in FIGS. 4A-4E, any configuration of the phase shifting elements may be used.

Additionally, as illustrated, the phase shifting elements 420b and 420c may be spaced apart from one another both a first and second dimension of the plane in which they lie, and the phase shifting elements 420b and 420c may not be adjacent to or abutted up against one another in either direction. In FIG. 4D, the portion of light 406b may experience a phase shift caused by the phase shifting element 420a. Additionally, the portion of light 406a may experience a phase shift induced by the temperature shift of phase shifting element 420f, but may not be affected by the phase shifting element 420e. It may be understood that when a portion of light is affected by a phase shifting element, the portion of light may be phase shifted due to the index of refraction change caused by the temperature change of the corresponding phase shifting element.

As depicted in FIG. 4D, the initial wavefront 437 may represent a plane wave and portions of light 406a and 406b of the plane wave may be phase shifted by the phase shifting elements 420a and 420f to produce a second wavefront 438, different from the initial wavefront 437. Further, after the portions of light pass through phase shifting elements 420c and 420d, the light may be phase shifted to produce a third wavefront 439, different from both the initial wavefront 437 and the second wavefront 438. Even though the portions of light 406a and 406b may be proximate to the phase shifting elements 420a and 420f at approximately the same time, a different applied current may cause a different phase shift to each of the portions of light 406a and 406b, thus producing light 408a and 408b that has a different second wavefront 438.

In some examples, the phase shifting elements may not be configured in a periodic, repeating pattern. In this example, either one or both of the portions of light 406a and 406b may be phase shifted by another set of phase shifting elements in the second column, and so on. In this way, the pixelated phase shifting elements may provide a random phase in which the portions of light may have different phases from one another, due to being affected by different phase shifting elements depending on the light path of the different portions of light. By providing portions of light with randomized phase shifts from one another, the coherent noise may be reduced as the portions of light with different phase shifts may provide different coherent noise views.

Figure 4E:
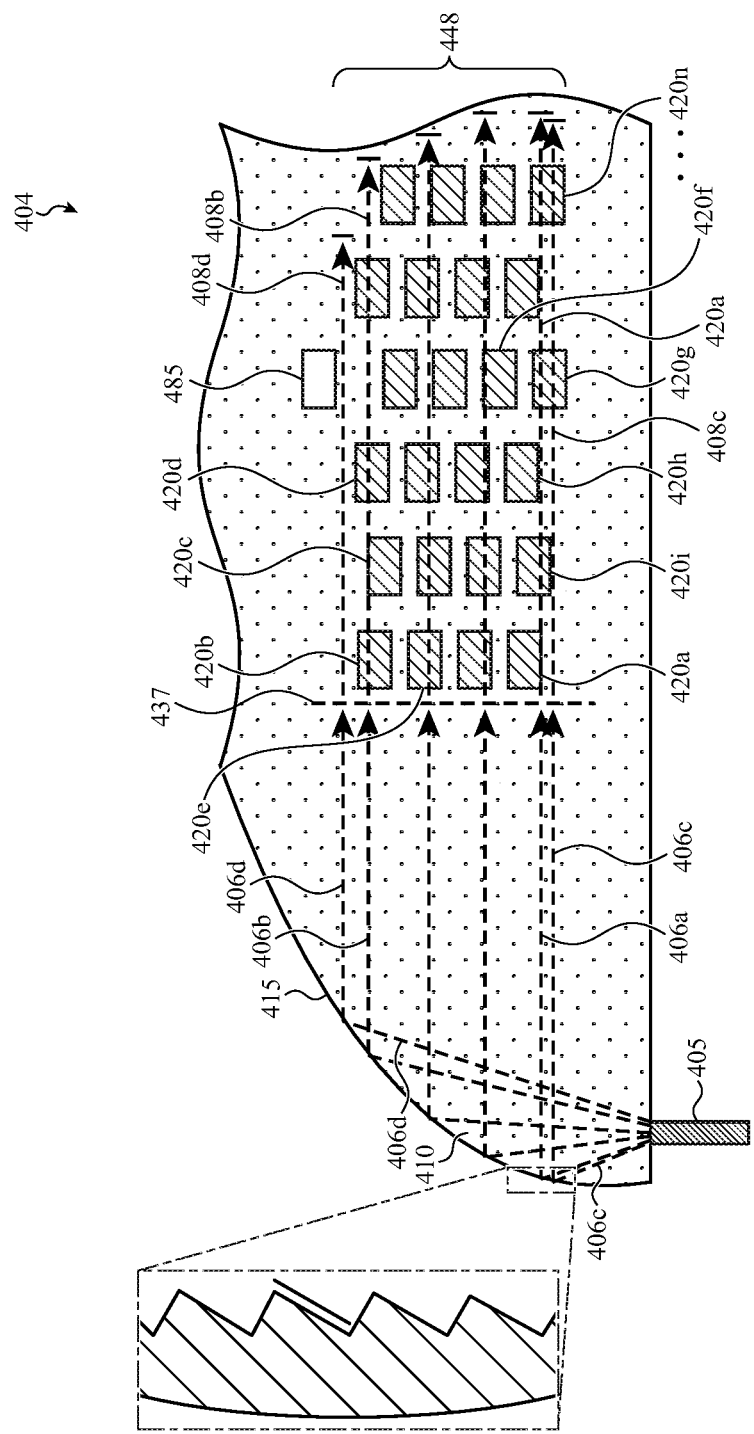

FIG. 4E is another configuration of an optical system for phase shifting light. The optical system 404 is a variation of the optical system 400 of FIG. 4A. The optical system 404 may include the same components of the optical system 400, with the phase shifting elements 420 in a different configuration. For the purposes of discussion, similarly numbered elements may have similar characteristics and functionality. Although 32 phase shifting elements are illustrated in FIG. 4E, any number of phase shifting elements may be used.

In some examples, the first phase shift element 420b may be a nearest neighbor to the phase shift element 420c and both phase shifting elements 420b and 420c may lie in a plane. The phase shifting elements 420b and 420c may not overlap with one another in a first dimension of the plane but may overlap one another in a second dimension of the plane. As such, the phase shifting elements may be offset from their nearest neighbor along both axes of a plane in which both of the phase shifting elements 420b and 420c lie.

Additionally, as illustrated, the phase shifting elements 420b and 420c may be spaced apart from one another in the up and down direction, as well as spaced apart from one another in the left to right dimension, and the phase shifting elements 420b and 420c may not be adjacent to or abutted up against one another in either direction. In FIG. 4E, the portion of light 406b may experience a phase shift caused by the phase shifting elements 420b, 420c, and 420d. Additionally, the portion of light 406a may experience a phase shift induced by the temperature shift of phase shifting elements 420a, 420g, 420h, and 420i, but may not be affected by the phase shifting element 420f. It may be understood that when a portion of light is affected by a phase shifting element, the portion of light may be phase shifted due to the index of refraction change caused by the temperature change of the corresponding phase shifting element.

Similar to FIG. 4D, in FIG. 4E, the initial wavefront 437 may represent a plane wave and portions of light 406a and 406b of the plane wave may be phase shifted by the phase shifting elements 420a and 420b, respectively, to produce a second wavefront 448. In FIG. 4E, the shift of the second wavefront 448 will depend on the applied current to the phase shifting elements 420 (which may be randomly or pseudo-randomly applied current), thus the second wavefront 448 is arbitrarily depicted in FIG. 4E. As shown in FIG. 4E, the portion of light 406b may be phase shifted by phase shifting element 420c and then by phase shifting element 420d. Similarly, the portion of light 406a may undergo multiple steps of phase shifts by the phase shifting elements 420a, 420i, 420h, and 420g. In this way, the pixelated phase shifting elements may provide a random phase in which the portions of light may have different phases from one another, due to being affected by different phase shifting elements depending on the light path of the portions of light. By providing portions of light with randomized phase shifts from one another, the coherent noise may be reduced as the portions of light with different phase shifts may provide different coherent noise views.

Additionally, portions of light 408a, 408b, 408c and so forth illustrate various portions of light that may be affected by different phase shifting elements as they propagate through the field of phase shifting elements 420 in the same direction as the light 406. For example, as portion of light 408a propagates from the reflective element 415 through the field of phase shifting element 420, portion of light 408a may be phase shifted by phase shifting elements 420i, 420d, and 420n. Likewise, portion of light 408b is phase shifted by at least phase shifting elements 420b, 420c, and 420d as the portion of light 408b propagates from the reflective element 415 through the field of phase shifting elements 420.

As depicted in FIG. 4E, the phase shifting elements 420a-420i may be metal tuning pads and may be a rectangular shape. In some examples, the phase shifting elements 420a-420i may be any shape such as triangular, circular, rectangular, trapezoidal, oval, any asymmetric shape, any symmetric shape, any combination thereof, and so forth. Additionally, the phase shifting elements may be different shapes from one another and different sizes from one another. Further, a first group of the phase shifting elements may be a first size and a second group of the phase shifting elements may be a second size different than the first size. It may be understood that any combination of shapes, sizes, and configurations of the phase shifting elements may be possible. In some examples, the phase shifting elements may be a metal that may heat as current passes through the metal and may be any type of metal such as platinum or gold. In some examples, the phase shifting elements may have an approximate heating range of up to 20-25 degrees Celsius. In some examples, the temperature may be increased to approximately 23 degrees Celsius or less.

In some examples, the temperature of the phase shifting elements may be measured using a separate metal monitoring pad that functions as a monitoring resistor that is positioned close to the heated region of the slab waveguide. By monitoring the change of temperature of the metal monitoring pad 485, the temperature differential for tuning may be controlled. In some examples, the temperature shift may be determined at a calibration stage. The calibration may be performed once due to the stability of the light sources. Additionally, the temperature changes may be correlated to the corresponding injection current applied to the phase shifting elements 420, so that the correct amount of current may be applied to achieve the desired temperature and, accordingly, the phase shift. The optical system may be a high speed system, where the speed may depend at least in part on the current injection speed and the thermal conductivity of the phase shifting elements 420.

In some examples, the current may be applied in a random pattern to the phase shifting elements 420, to provide randomly phase shifted light. Randomly applied current may result from temporally varying the current by applying currents at different times and/or by changing the amount of applied current to the phase shifting elements(s). The randomly heated phase shifting elements 420 may scramble the phase front of the light. It may be understood that the temperature of the phase shifting elements 420 may be controlled individually, in groups, or all at once. One or more phase shifting elements may be heated at the same time and to different temperatures or all the phase shifting elements may be heated at the same time to different temperatures.

In some examples, the current may be applied serially to the phase shifting elements. In still further examples, a look-up table may be accessed by a controller to apply predetermined currents that provide pseudo-random phase shifts to the light insofar as the phase shifts of the light may be random enough to provide coherent light reduction. Because the applied currents may be predetermined and not randomly generated, this may not provide truly random phase shifts and may instead provide pseudo-random phase shifts. Additionally, when heating more than one phase shifting element at the same time, elements that are aligned at the same point along the optical path of light, such as phase shifting elements 420a and 420b and 420i and 420c, may be flagged in the look-up table so that the same current may not be applied at the same time.

In still further examples, the temperature shift may be observed via a feedback loop in which some of the optical power may be tapped and split off to be transmitted to an optical power monitor. The optical power may be monitored continuously in a feedback loop to monitor the peak wavelength shift caused by the temperature change, may be continuously or periodically monitored for optical power, or may be monitored periodically in a feedback loop due to the stable nature of the light sources.

Also shown in the expanded section of FIG. 4E are the reflective facets 450 of the reflective element 415. The expanded section of FIG. 4E is for illustrative and explanatory purposes and is not to scale. Additionally, although four reflective facets 450 are illustrated, the reflective element 415 may include any appropriate number of reflective facets 450. Each of the reflective facets 450 may be approximately equidistant from one another. Additionally, the optical system 404 may include an input waveguide such as the first waveguide 405 for emitting light toward the reflective element 415 and the light reflected off of the reflective facets of the reflective element 415 may propagate through the second waveguide 410.

Figure 5:
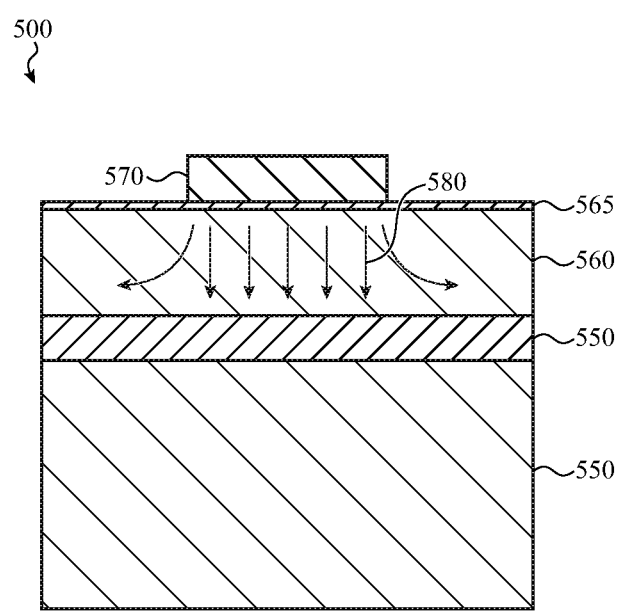
FIG. 5 illustrates a cross-section of an optical component with a phase shifting element.

FIG. 5 illustrates a cross-section of an optical component with a phase shifting element. The optical component 500 includes a silicon substrate 550, a second waveguide that may be a slab waveguide and that includes a first cladding layer 565, a silicon layer 560, a second cladding layer 555, and a phase shifting element 570. As shown in FIG. 5, the second cladding layer 555 may be disposed on the silicon substrate 550, the silicon layer 560, which may be a propagation region, may be disposed on the first cladding layer 565, and the first cladding layer 565 may be disposed on the silicon layer 560. Additionally, the phase shifting element 570 may be disposed on the first cladding layer 565. As depicted in FIG. 5, light propagating into the slab waveguide may propagate into or out of the plane of the page.

As described with reference to FIG. 5, the phase shifting element 570 may be disposed on top of the slab waveguide. As shown in FIG. 5, the light may pass through the propagation region of the slab waveguide and underneath the phase shifting element 570. The light may propagate through the propagation region of the waveguide, which is the silicon layer 560. Once heat is applied to the phase shifting element 570, the heat 580 may propagate through the first cladding layer 565 and into the propagation region.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An optical system, comprising:
a first waveguide configured to provide light;
a second waveguide optically coupled to the first waveguide and configured to receive the light from the first waveguide;
a reflective element configured to reflect the light, and
multiple phase shifting elements disposed on the second waveguide and configured to:
 phase shift a first portion of the light by a first phase from an initial phase; and
 phase shift a second portion of the light by a second phase from the initial phase, wherein the second phase is different than the first phase.

2. The optical system of claim 1, wherein:
the reflective element has a parabolic shape to collimate the reflected light;
the multiple phase shifting elements phase shift the first portion of light and the second portion of light by locally changing an index of refraction of the second waveguide;
the multiple phase shifting elements provide randomized phase shifts; and
the first and the second phase shifts are associated with different coherent noise views.

3. The optical system of claim 1, wherein the reflective element comprises a metal-coated surface.

4. The optical system of claim 1, wherein the multiple phase shifting elements are metal pads.

5. The optical system of claim 1, wherein the multiple phase shifting elements are offset from a nearest neighbor along both axes of a plane in which all of the multiple phase shifting elements lie.

6. The optical system of claim 1, wherein:
the first portion of light is phase shifted by a first phase shifting element of the multiple phase shifting elements; and
the second portion of light is phase shifted by the first phase shifting element and a second phase shifting element of the multiple phase shifting elements.

7. The optical system of claim 1, wherein the first portion of light is phase shifted by changing a temperature of a corresponding phase shifting element of the multiple phase shifting elements.

8. The optical system of claim 7, wherein:
the second waveguide is a slab waveguide; and
the change in the temperature of the corresponding phase shifting element locally changes an index of refraction of a portion of the slab waveguide.

9. An optical system providing randomly phase shifted light, comprising:
a strip waveguide configured to emit light;
a slab waveguide optically coupled to the strip waveguide and positioned to receive the light from the strip waveguide;
a reflective element optically coupled to and positioned on an edge of the slab waveguide and configured to:
 receive the light from the slab waveguide; and
 reflect the light; and
multiple phase shifting elements disposed on the slab waveguide and configured to:
 phase shift a first portion of the light by a first phase; and
 phase shift a second portion of the light by a second phase.

10. The optical system of claim 9, wherein:
the slab waveguide comprises:
 a first cladding layer;
 a propagation region; and
 a second cladding layer; and
the multiple phase shifting elements are disposed on the first cladding layer to phase shift light propagating through the slab waveguide.

11. The optical system of claim 9, wherein:
the first portion of light propagates proximate to a first phase shifting element; and
the second portion of light propagates proximate to a second phase shifting element different than the first phase shifting element.

12. The optical system of claim 9, wherein each of the multiple phase shifting elements comprises a metal pad.

13. The optical system of claim 9, wherein a first phase shifting element of the multiple phase shifting elements and a second phase shifting element of the multiple phase shifting elements, wherein:
the first and second phase shifting elements are nearest neighbors;
the first and second phase shifting elements both lie in a plane; and
the first phase shifting element partially overlaps the second phase shifting element in one dimension of the plane in which the first and second phase shifting elements lie.

14. The optical system of claim 9, wherein a current source is configured to apply random currents to the multiple phase shifting elements, thereby changing temperatures of the multiple phase shifting elements.

15. The optical system of claim 9, wherein the reflective element is parabolic and configured to reflect light such that a wavefront of the light is a plane wave.

16. A method for providing a wavefront with randomized phase shifts of light, comprising:
emitting light from a first waveguide into a second waveguide;
reflecting the light from a reflective element that collimates the light and is positioned at an edge of the second waveguide;
shifting a phase, using a first phase shifting element disposed on the second waveguide, of a first portion of light by a first phase from an initial phase; and
shifting a phase, using a second phase shifting element disposed on the second waveguide, of a second portion of light by a second phase from the initial phase, wherein the second phase is different than the first phase.

17. The method of claim 16, wherein:
phase shifting of the first portion of light and the second portion of light, comprises:

heating the first phase shifting element to a first temperature; and heating the second phase shifting element to a second temperature that is different than the first temperature.

18. The method of claim 17, wherein:

heating the first phase shifting element to the first temperature comprises applying a first current to the first phase shifting element; and heating the second phase shifting element to the second temperature comprises applying a second current to the second phase shifting element; wherein the second current is different from the first current.

19. The method of claim 17, wherein:

heating the first phase shifting element changes an index of refraction of a first portion of the second waveguide; and heating the second phase shifting element changes an index of refraction of a second portion of the second waveguide.

20. The method of claim 16, wherein the first phase is based, at least in part, on a localized index of refraction shift of the second waveguide, when the first portion of light propagates proximate to multiple phase shifting elements.

21. The method of claim 16, further comprising:

applying a unique current to the first phase shifting element and the second phase shift element, thereby heating the first and second phase shifting elements.

22. The method of claim 16, further comprising:

applying a first current to the first phase shifting element; and applying a second current to the second phase shifting element; wherein:

the first and second currents are different and the first and second phase shifting elements are individually controllable.

23. The method of claim 16, further comprising:

applying a first time-randomized current to the first phase shifting element; and applying a second time-randomized current to the second phase shifting element.

\* \* \* \* \*